Dec. 23, 1952     H. E. L. OWEN ET AL     2,622,800
TIDE CALCULATOR
Filed Dec. 17, 1948     4 Sheets-Sheet 1
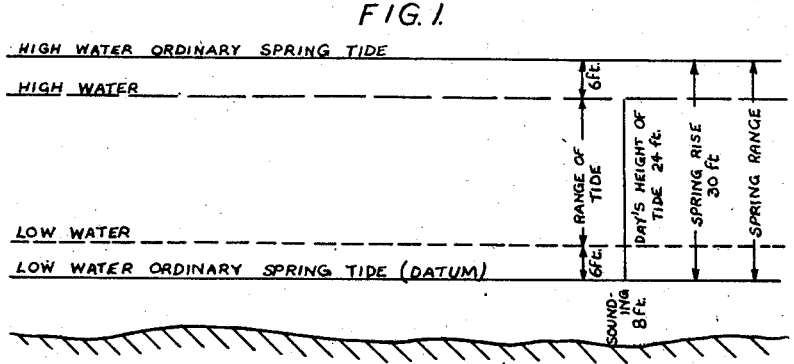
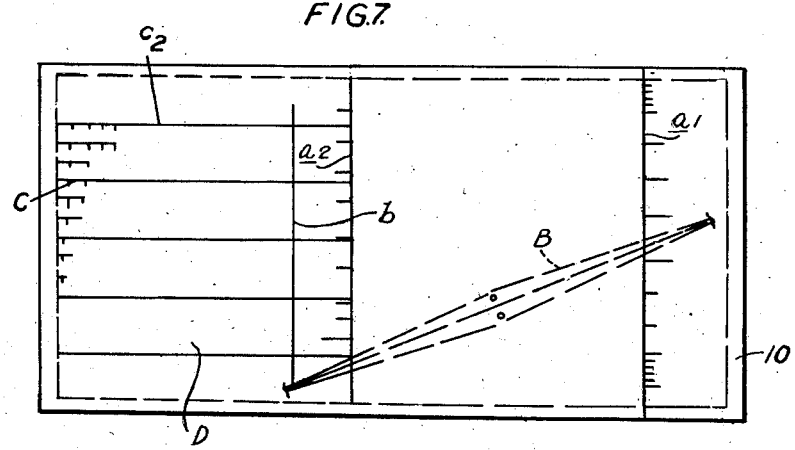
Inventors
Henry Ernest Lloyd Owen
Robert Elias Lloyd Owen
By
Dowell and Dowell
Attorneys Dec. 23, 1952  H. E. L. OWEN ET AL  2,622,800
TIDE CALCULATOR
Filed Dec. 17, 1948  4 Sheets-Sheet 2
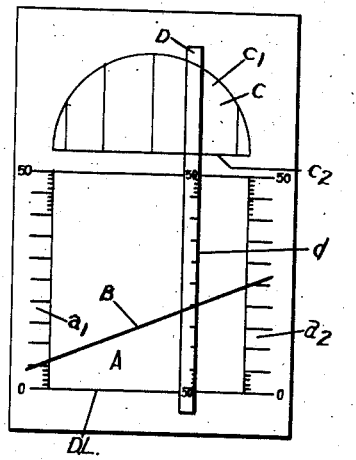
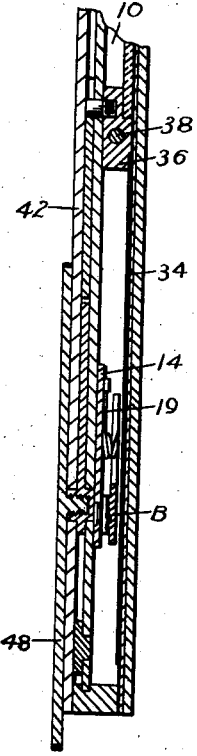
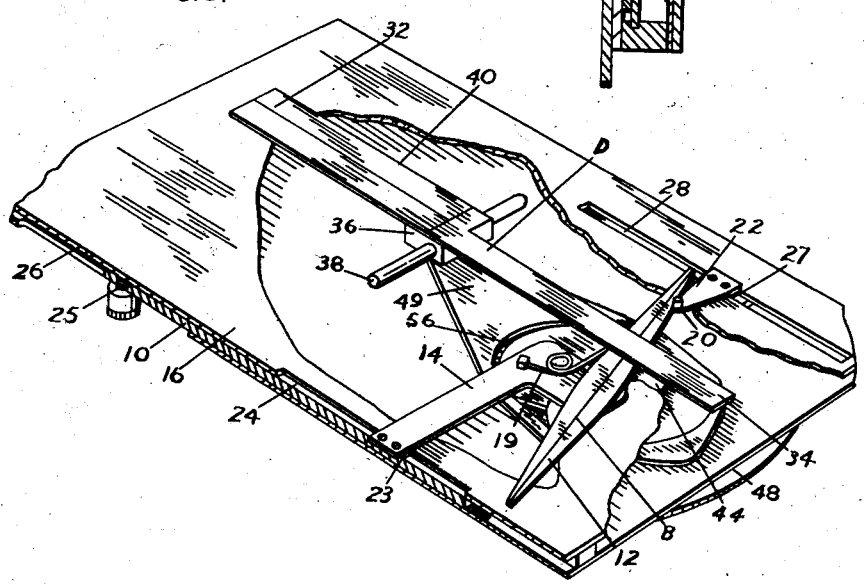

Patented Dec. 23, 1952

2,622,800

UNITED STATES PATENT OFFICE 2,622,800

TIDE CALCULATOR

Henry Ernest Lloyd Owen and Robert Elias Lloyd Owen, London, England, assignors to Tidak Ltd., London, England Application December 17, 1948, Serial No. 65,794 In Great Britain December 19, 1947

3 Claims. (Cl. 235—61)

This invention relates to devices for evaluation of data relating to tides and, in particular, to a device for evaluating the height of tide water at any given time. Devices of this nature have previously been used but they all involve either fairly extensive calculation or fairly extensive draftmanship before the user can be given the depth of water. This is information which is indispensable to the navigator and which he must be able to determine for himself very rapidly.

The device in accordance with the invention enables such evaluations to be made by means which involve the very minimum of calculation. Indeed, the only calculation which is required in order to determine the depth of water is to add to an amount determined by setting the device, the depth of water at low water ordinary spring tide which is ascertainable from charts or nautical tables and is generally referred to as the sounding.

The invention will be explained by reference to the accompanying drawings in which:

Fig. 1 is a diagram for elucidating various technical terms used herein;

Fig. 2 is a schematic representation for the principle underlying the construction and use of the device of the invention;

Fig. 5 is a perspective view of part of Fig. 3 with certain parts shown broken away;

Fig. 6 is a section taken on the line VI—VI in Fig. 3, and

Fig. 7 is a schematic representation of a modified form of the instrument shown in Figs. 3–6.

Figure 3:
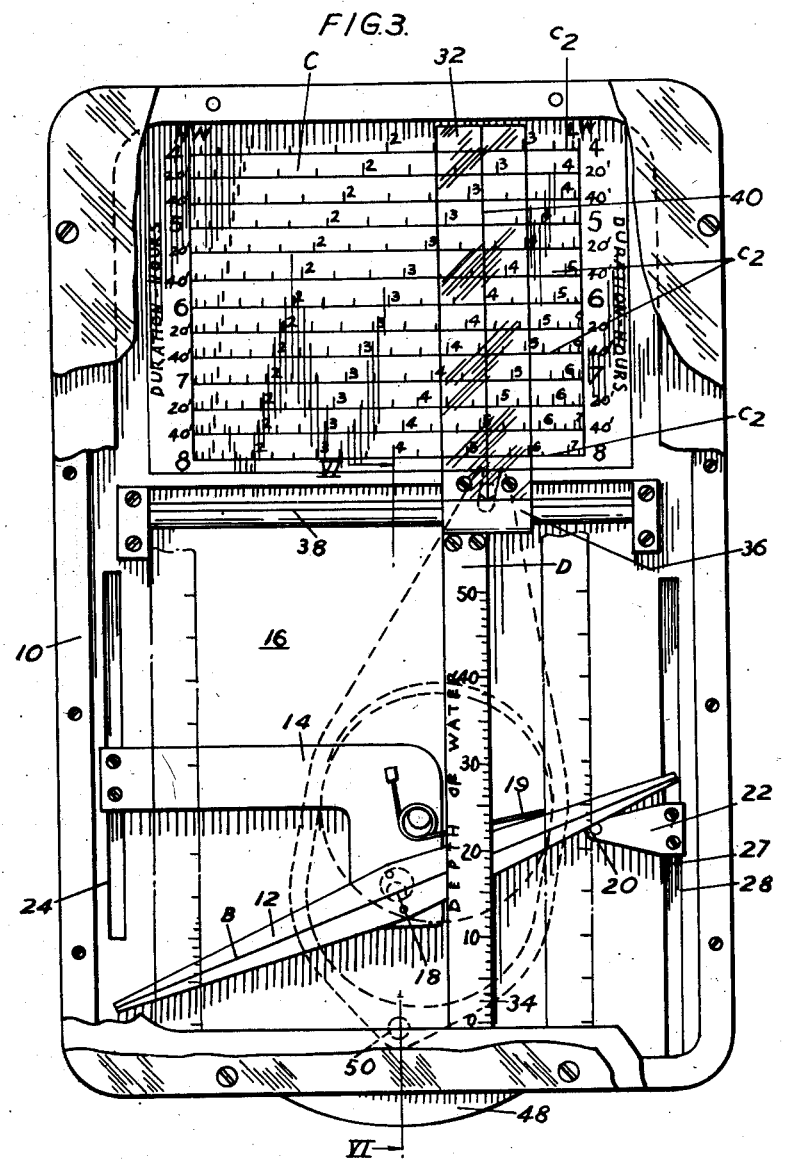
Fig. 3 is a front view of a preferred embodiment of an instrument in accordance with the invention.

In order that the terms used herein in relation to tides may be unquestionably understood, they will be explained with reference to Figure 1 of the accompanying drawings.

The difference in level at High Water and at Low Water for any particular tide is known as the Range.

The range and the high and low water levels vary cyclically with the phases of the moon. They also vary with local conditions such as wind and barometric conditions. The highest and most extensive tides are known as Spring Tides and, where the effect of local conditions is neglected, they are referred to as Ordinary Spring Tides.

Nautical tables usually give data in connection with tides in relation to a Datum level which can be at any arbitrary level but is generally chosen as that of Low Water at Ordinary Spring Tide. The depth of the ocean bed below the Datum is known as the Sounding. The height above the Datum to which the water rises at any particular tide is known as the Height of Tide or the Rise.

Clearly, if the Datum coincides with Low Water Ordinary Spring Tide, the Spring Range and the Spring Rise are equal.

It will be clear from an inspection of Fig. 1, the difference between the Spring Rise and the day's Height of Tide is the same as the difference between High Water Ordinary Spring Tide and High Water for the tide in question and, therefore, also as the difference between Low Water and the Datum level.

Any particular tide rises and falls at the same overall rate but the rate varies from moment to moment during the period of the tide. Change in water level cannot be expressed as a linear function of time; it is more nearly a simple harmonic function of time.

Fig. 2 of the accompanying drawings is a diagram showing the principle upon which the construction of the devices in accordance with the invention is based.

A is a chart, having two parallel scales $a^1$, $a^2$. The line B is drawn from a point on the scale $a^1$ representing Low Water for a particular tide to a point on the scale $a^2$ representing High Water for that tide.

C is a time scale. Its semi-circular edge $c^1$ is divided linearly to represent equal intervals during the duration of the tide. Its straight edge $c^2$ is divided by dropping on to it perpendiculars from the divisions of the edge $c^1$ and, therefore, forms a simple harmonic time scale.

D is a cursor the edge $d$ of which is divided similarly to the scales $a^1$ and $a^2$ and which can be moved across parallel to those scales.

The line DL joining the zero points on the scales $a^1$, $a^2$ and $d$ represents the Datum line.

From the explanations given above, it should be clear that in any position of the cursor D, its scale $d$ will be intersected by the line B at a point which will indicate the height of water above Datum at the time indicated by the intersection of the scale $c^2$ by the cursor. Therefore, by setting the cursor at any particular time on the scale $c^2$, the height of water at that time (which is the information generally required by the mariner) will be given on the scale $d$.

If, as was done above, the left hand scale $a^1$ is used as the Low Water scale and the scale $a^2$ as the High Water scale, the time scale C will have its zero at the left hand side for a rising tide and at the right hand side for a falling tide. Thus, the time scale C is read from left to right or from right to left according as the tide is rising or falling.

Alternatively, the scale $a^1$ can be used as the low water scale for a rising tide and the high water scale for a falling tide, in which case, the time scale, will always be read from left to right.

Figure 4:
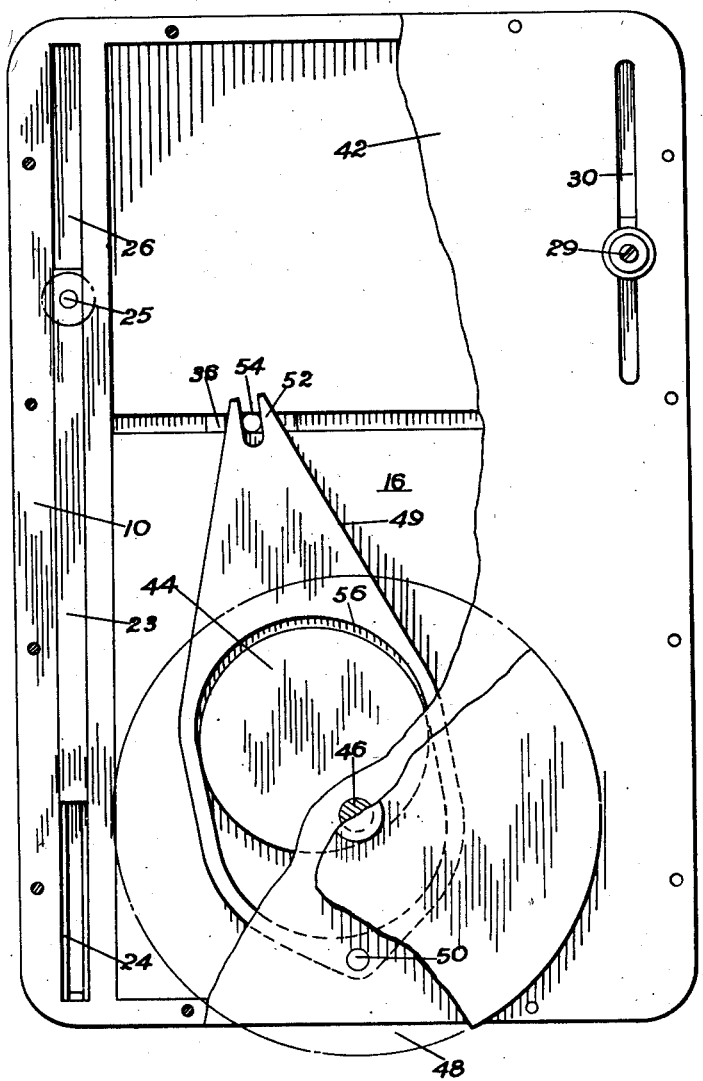
Fig. 4 is a rear view of said instrument.

Figs. 3-6 of the accompanying drawings show a practical embodiment of an instrument based on the principle explained in connection with Fig. 2.

The instrument has a frame 10 within which is fixed a panel C on which are marked a series of time scales $c^2$.

The time taken by a tide to fall and to rise varies in different parts of the world from 4 to 8 hours. The panel C has a number of horizontal scales $c^2$ all of the same length and representing tide durations of from 4 hours to 8 hours at 20-minute intervals. Each of the scales $c^2$ is harmonically divided by the method explained in connection with Fig. 2 as to give indications of 20-minute time intervals over the duration of the tides.

Within the frame 10 below the panel C is a pointer 12 having a line B on it which corresponds to the line B of Fig. 2. This pointer is carried by a plate 14 mounted to slide up and down on the base 16 of the instrument. Its pivotal axis 18 lies on the line B and midway along its length. A spring 19 carried by the plate 14 urges the pointer clockwise so that it rests on a pin 20 on a plate 22 mounted to slide up and down on the base 16.

The plate 14 is attached to a rod 23 which lies in a guide slot 24 in the base 16 and has a pin 25 which projects out through a slot 26 in the base. The plate 22 is similarly attached to a rod 27 which lies in a guide slot 28 in the base and has a pin 29 which projects out through a slot 30 in the base. Thus by moving the plate 14 by means of the pin 25, the pointer 12 can be moved bodily up and down and by moving the plate 22 by means of the pin 29, the pointer can be swung about its pivot.

A cursor D is also provided which is mounted to slide across the base 16. It has an upper part 32 and a lower part 34 attached to a member 36 which is mounted to slide across the base 16 on a fixed rod 38. The upper part 32 is transparent and has a line 40 scribed on it; the lower part 34 is in the form of a "straight edge" aligned with the line 40 and is provided with a scale which corresponds to the scale $d$ of Fig. 2.

The frame has a back cover plate 42 on the inside of which is mounted an eccentric 44. The shaft 46 of the eccentric has fixed to it a large wheel 48 having a milled edge which projects beyond the frame work. The eccentric is connected to the cursor D by means of a connecting member 49 which is pivotally mounted on the base at 50, has a forked upper end 52 which embraces a pin 54 on the sliding member 36 and has an oval opening 56 in which the eccentric 44 engages. By turning the wheel 48, the cursor D can thus be moved across the base 16.

The manner in which the device functions is best explained by means of a practical example of its use.

Let is be assumed, for example, that it is required to determine what depth of water there will be at a particular point on a given chart at 1400 hours on a particular day. The chart indicates a sounding of 8 feet at that point; the Nautical Almanack gives the time of high water as 1200 hours, the day's height of tide as 24 ft., the spring rise as 30 ft. and the duration of tide rise or fall as 6 hours.

As already explained, the difference between the spring rise (30 ft.) and the day's height of tide (24 ft.) gives the height at low water above low water ordinary spring tide, i. e. 6 ft.

At 1400 hrs. the tide will be falling. The pointer 12 is therefore set so that its line B falls from a point on the scale $a^2$ (Fig. 2) representing high water (24 ft.) to a point on the scale $a^1$ (Fig. 2) representing low water (6 ft.). This is done by manipulation of the two pins 25 and 29, the cursor D being placed successively along the left-hand edge and the right-hand edge of the frame and the pointer being set against the appropriate markings on its scale and taking up the position shown in Fig. 3.

The cursor is then moved so that its line 40 coincides with the 4 hours division on the 6-hour line of the time scale, the time (1400 hrs.) at which the height of water is required being 2 hours after the time of high water or 4 hours before the time of low water. The cursor is shown in that position in Fig. 3 and, as will be seen, its scale is intersected by the line B at a height of 19½ feet.

The height of water above datum (low water ordinary spring tide) at the point and time in question will, therefore, be 19½ feet and, in order to ascertain the depth of water, it is necessary only to add the sounding of 8 feet. Thus, the depth is 27½ feet.

It will be realised that the whole operation has been effected by making one simple subtraction to ascertain the height of low water and one simple addition to ascertain the finally required depth of water.

The device shown in Figs. 3-6 can be varied in many ways. Thus, the time scale could be arranged on the cursor D at the side of, instead of above, the pointer so that the device would be as shown diagrammatically in Fig. 7 to which the same references have been applied as to Fig. 2. In this case the low water scale A' is secured on the frame 10 and the high water scale $A^2$ is on the right hand edge of the cursor. An index line $b$ is arranged on the transparent cover of the frame above the cursor. In using the device, the line B is set against the low and high water values on the scales A' and $A^2$ respectively, while the cursor is positioned at the left of the frame; the cursor is then moved to the right so that the appropriate time on the time scale is in register with the index line $b$ and the registered height of water is then indicated by the intersection of the line B with the scale $A^2$.

It will be understood that many departures can be made from the arrangements described above. Thus, in the case of Figs. 3-6 the pointer could be arranged so as to be set by many different forms of mechanism, a notable example being quick pitch screws. The pointer 12 having a line B on it could be replaced by a "straight-edge" as could the upper part 32 of the cursor. Conversely, the lower part 34 of the cursor could be made transparent and have a line marked on it to serve as the index line.

It will also be understood that the device in accordance with the invention can be used for other purposes than that of determining the depth of water at a particular point and a particular time. Obviously, it could be used for the converse problem of determining the time at which there will be a particular depth of water.

We claim:

1. A device for evaluating data relating to tides comprising a frame, a first linearly divided scale fixed in said frame, a second linearly divided scale mounted in said frame parallel with said first scale, means for moving said second scale towards and away from said first scale, a pivot mounted in said frame between said scales, means for moving said pivot parallel to said scales, index means carried by said pivot and providing a straight index line intersecting said scales, means for turning said index means about said pivot, a set of harmonically divided scales parallel to each other and at right angles to said linearly divided scales and index means providing a straight index line intersecting said harmonically divided scales, said harmonically divided scales and said last mentioned index means being mounted for relative movement by said means for moving said second linearly divided scale.

2. A device as claimed in claim 1 in which said harmonically divided scales are fixed in said frame and said last mentioned index means are movable with said second linearly divided scale.

3. A device as claimed in claim 1 in which said last mentioned index means is fixed in said frame and said harmonically divided scales are movable with said second linearly divided scale.

HENRY ERNEST LLOYD OWEN.
ROBERT ELIAS LLOYD OWEN.

REFERENCES CITED

The following references are of record in the file of this patent:

UNITED STATES PATENTS

| Number | Name | Date |
|---|---|---|
| 1,667,812 | Miller | May 1, 1928 |
| 2,296,799 | Rosin | Sept. 22, 1942 |

FOREIGN PATENTS

| Number | Country | Date |
|---|---|---|
| 383,822 | Germany | Oct. 18, 1923 |
| 574,743 | Great Britain | Jan. 18, 1946 |